Patented May 2, 1939

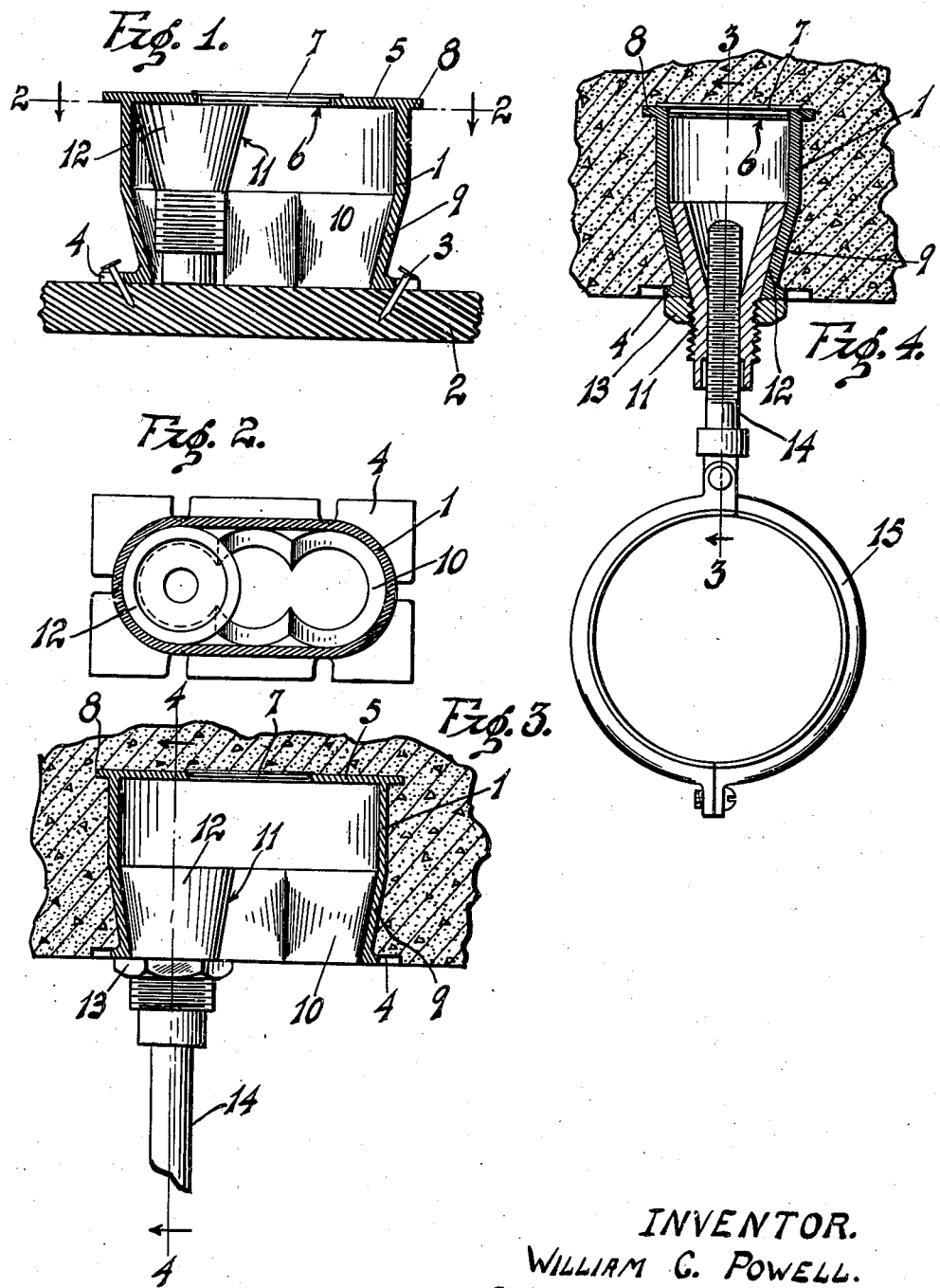

2,156,639

UNITED STATES PATENT OFFICE 2,156,639

PIPE HANGER

William C. Powell, Lynwood, Calif., assignor of one-half to Clifford L. McAuliffe, San Pedro, Calif.

Application October 12, 1936, Serial No. 105,184

4 Claims. (Cl. 72—105)

This invention relates to a pipe hanger particularly adapted to support pipe on concrete walls or floors, the hanger being embedded in the concrete at spaced intervals along the wall or floor, and being provided with a threaded stem carrying the pipe support.

An object of my invention is to provide a novel pipe hanger which includes a nut adjustably positionable in the body of the hanger, said nut projecting below the body of the hanger when in operative position.

Another object is to provide a novel pipe hanger of the character stated, the body of which is provided with a plurality of seats, each of which may receive a nut, and said seats being tapered for the purpose of positively positioning the nut within the body.

Another object is to provide a novel pipe hanger in which the projecting stem can be quickly and easily adjusted for the purpose of aligning the pipe.

Still another object is to provide a pipe hanger of the character stated which is simple in construction and inexpensive to manufacture.

Other objects, advantages and features of invention may appear from the accompanying drawing, the subjoined detailed description, and the appended claims.

In the drawing

Figure 1 is a transverse sectional view of my pipe hanger in position prior to pouring the concrete wall or floor.

Figure 2 is a sectional view taken on line 2—2 of Fig. 1.

Figure 3 is a transverse sectional view of the pipe hanger in operative position in a concrete slab, taken susbtantially on line 3—3 of Fig. 4.

Figure 4 is a sectional view taken on line 4—4 of Fig. 3.

In structures of this character, the body of the pipe hanger is suitably attached to the concrete form. Thereafter the concrete slab is poured around the body of the hanger and when the form is stripped, the bottom of the hanger body is exposed and the mounting nut projects from the body, whereupon the stem is threaded into the nut to support a length of pipe. This construction will be evident from the following detailed description:

The body 1 of the hanger is first nailed to the concrete form 2 by means of nails 3 which extend thru suitable openings in the bottom flange 4. The lower end of the body is open and is pressed tightly against the form 2, as shown in Fig. 1. A wall 5 closes the body at the top and this top wall is provided with a central opening 6, said opening being closed by a removable cap 7. The purpose of this removable cap is to permit the insertion of a nut prior to nailing the body 1 to the form, as previously described.

Flanges 8 at the top of the body enable said body to be more securely embedded in the concrete. The lower end of the body is tapered inwardly, as shown at 9, and a plurality of tapered seats 10 are arranged in the lower part of said body. A nut 11 is provided with a tapered head 12 which is selectively positioned in one of the seats 10. The lower end of the nut is threaded both exteriorly and interiorly, the exterior threads receiving a lock nut 13 which holds the nut securely in position, as shown in Figs. 3 and 4.

A stem 14 screws into the nut and therefore, is adjustable relative to said nut. The stem 14 carries a band or the like 15 which encircles or grasps the pipe.

In operation, the pipe hanger is mounted as shown in Fig. 1 prior to pouring the concrete slab. After the form 2 is stripped, the nut 11 drops as shown in Figs. 3 and 4. This nut can then be adjusted within the body 1 and rests in one of the seats 10. The lock nut 13 is then applied, thus securely holding the nut in position. The stem 14 is then screwed into the nut and can readily be adjusted to align the pipe.

Having described my invention, I claim:

1. A pipe hanger comprising a body, a plurality of adjoining tapered seats in the body, said body being open at the bottom, a nut in the body, a tapered head on the nut, said nut being adapted to rest in one of the seats, said nut projecting from the body when in operative position, and said nut being threaded to receive a pipe supporting stem.

2. A pipe hanger comprising a body, a plurality of adjoining tapered seats in the body, said body being open at the bottom, a nut in the body, a tapered head on the nut, said nut being adapted to rest in one of the seats, said nut projecting from the body when in operative position, said nut being threaded to receive a pipe supporting stem, and said nut being exteriorly threaded to receive a lock nut.

3. A pipe hanger comprising a body, a plurality of adjoining tapered seats in the lower end of the body, said body being open at the bottom, a nut, a tapered head on the nut, said head being adapted to rest on one of the seats, said nut being interiorly threaded to receive a pipe supporting stem, said body having a hole in the top thereof, and a cap closing said hole, said nut being adapted to be placed in the body through said hole.

4. A pipe hanger comprising a body, a plurality of adjoining tapered seats in the lower end of the body, said body being open at the bottom, a nut, a tapered head on the nut, said head being adapted to rest on one of the seats, said nut being interiorly threaded to receive a pipe supporting stem, said body having a hole in the top thereof, a cap closing said hole, said nut being exteriorly threaded to receive a lock nut, said nut being adapted to be placed in the body through said hole.

WILLIAM C. POWELL.